April 26, 1966 R. L. CREMER 3,247,827
BARBECUE ACCESSORY
Filed Oct. 8, 1963 2 Sheets-Sheet 1
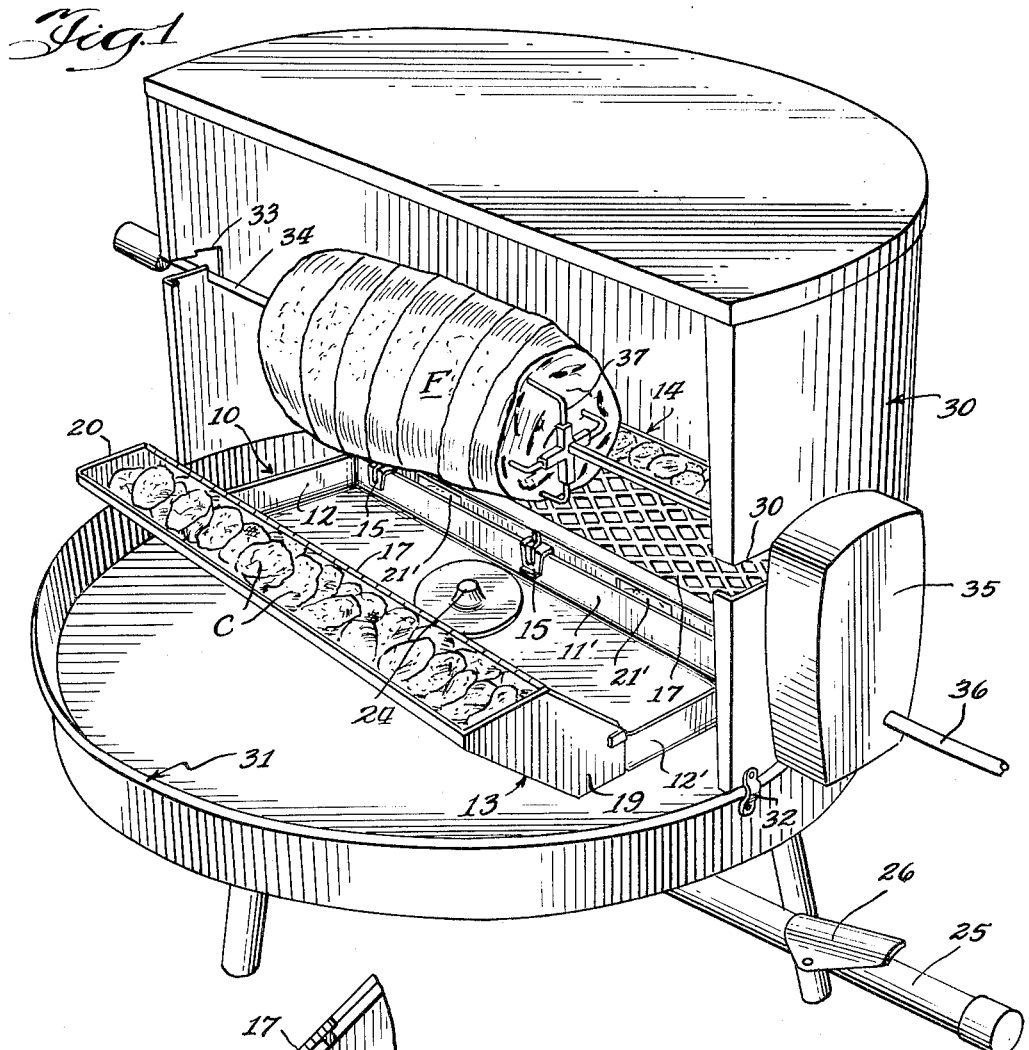
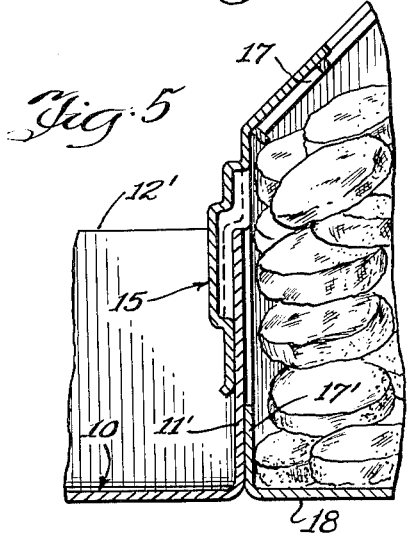
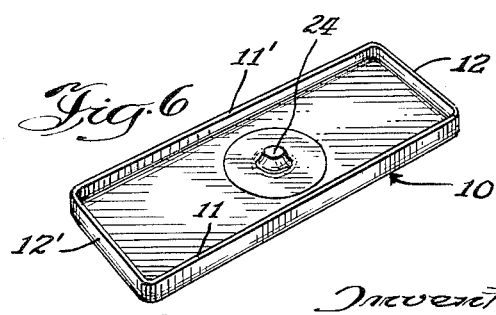
Inventor
Robert L. Cremer
By Merriam, Smith & Marshall
Attorneys April 26, 1966  R. L. CREMER  3,247,827
BARBECUE ACCESSORY
Filed Oct. 8, 1963  2 Sheets-Sheet 2
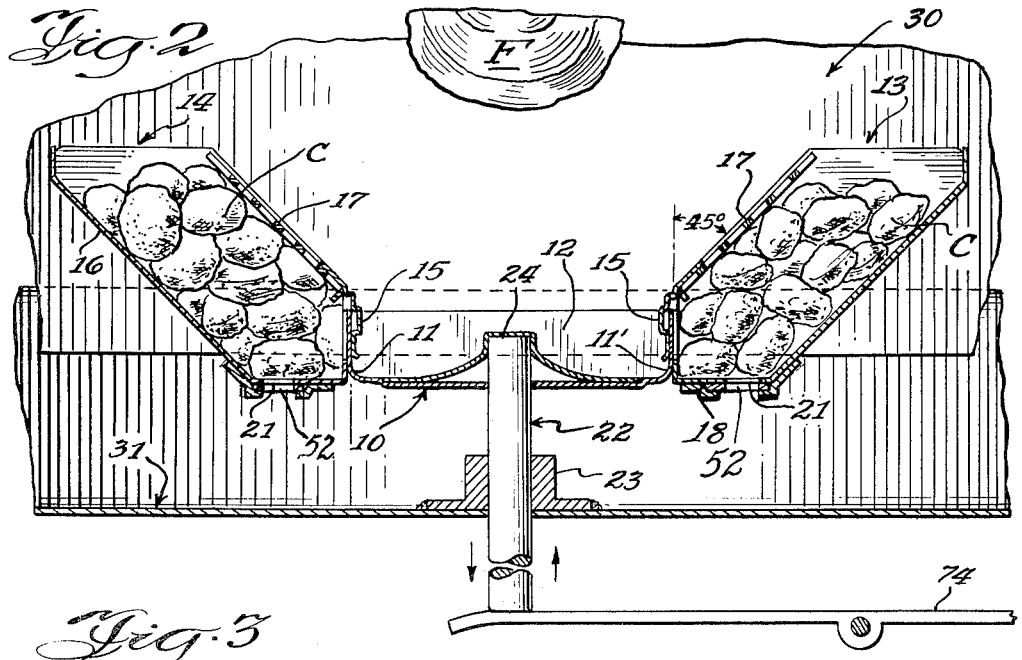

United States Patent Office 3,247,827
Patented Apr. 26, 1966

3,247,827
BARBECUE ACCESSORY
Robert L. Cremer, Freeport, Ill., assignor to Structo Manufacturing Company, a corporation of Illinois
Filed Oct. 8, 1963, Ser. No. 314,785
12 Claims. (Cl. 126—25)

This invention relates to a cooking apparatus. It is more particularly concerned with a barbecue accessory for use in supplying heat to a spit.

Outdoor cookery has had considerable acceptance by those who participate in outdoor living. Although outdoor cooking has been utilized by campers and picnickers for the preparation of food, city dwellers have taken advantage of the outdoor areas surrounding their residences for the purposes of entertaining of family living. Initially, in such residential areas outdoor cooking was carried out on cumbersome brick or masonry fire places which were permanently installed in the yard area. Some installations are still used, however, they have been largely supplanted by portable braziers which have been made available at relatively low cost. The generally available braziers, which are employed for barbecue purposes, are simple devices consisting of a firebox and a grill overlying it. They are small enough to be portable and can be readily stored, thereby further enhancing their use.

Although the grill suffices for most barbecue purposes, in the event that larger pieces of meat, such as roasts, or poultry are to be cooked in one piece on the barbecue brazier, a rotating spit powered by a small electric motor is used. Rotating spits can be obtained as accessories for most commercially available braziers.

Heat for cooking is provided by a number of fuels, such as gelled alcohol, liquefied petroleum gas, solid fuels such as wood or charcoal, and others. For most purposes, however, charcoal is widely used in portable braziers. When ignited, the charcoal glows to provide an intense heat sufficient without accompanying flames which would tend to give an uneven distribution of heat.

When meat or poultry is being barbecued over the heat source, whether on a grill or spit, some of the fatty constituents of the meat or poultry are liquefied and released into the fixebox and onto the fuel. These fatty constituents are flammable and cause sporadic eruptions of flames which attenuate the value of the use of charcoal as an even source of heat. Although the sporadic flaming can be controlled by the spraying of water on the fuel, gourmets eschew this approach because of the stewing effect that the steam purports to have on the meat or poultry. Aside from this, it is also disadvantageous to allow the dripping of the fat onto the fuel to occur because of the smoke which is produced by the burning of the fatty constituents.

According to this invention, the disadvantages resulting from the combustion of the fatty constituents of meat or poultry on a barbecue brazier are minimized by utilizing a spit, in conjunction with an auxiliary firebox, which replaces the conventional barbecue brazier firebox. The auxiliary firebox of this invention, instead of underlying the food being barbecued, extends upwardly from either side of a base plate to provide a source of radiant heat for cooking purposes which is directed in substantially a horizontal direction. The fat dripping from the cooking food falls onto the base member instead of the fuel source. The base member functions as a drip pan to collect the fatty, flammable drippings and keeps them isolated from the heat source which would cause their combustion.

Referring to the drawings:
FIGURE 1 illustrates the use of the auxiliary firebox of this invention employed in conjunction with a rotating spit provided as a standard accessory for a conventional barbecue brazier;

FIGURE 2 is a cross-sectional view of the auxiliary firebox illustrating the manner in which it can be mounted on a conventional barbecue brazier;

FIGURE 3 is a partial plan view of the auxiliary firebox illustrating a portion of the drip pan base member of one of the obliquely mounted fireboxes;

FIGURE 4 is an elevation view of one of the auxiliary fireboxes illustrating the clip system which can be employed for removably mounting the fireboxes on the drip pan base plate;

FIGURE 5 is an enlarged fragmentary view showing the struck-out clips which are used on the firebox for removably mounting the fireboxes on the base member in engagement with the upturned sides of the base member;

FIGURE 6 is a perspective view showing in reduced size an embodiment of a drip pan base member which can be employed; and FIGURE 7 is a fragmentary sectional view showing the slide which serves to act as a draft control means.

Although the subject invention can be placed on any conventional support or be provided with a suitable support arrangement and be utilized alone without the aid of a conventional barbecue brazier, it is more convenient to utilize the grill adjustment provisions of a barbecue brazier as well as the various accessories which are available for such a cooking unit as a base member for the barbecue accessory of this invention. Accordingly, the following description will be limited to the utilization of the barbecue accessory of this invention in conjunction with a barbecue brazier, it being understood, however, that this description is for the purposes of illustration and is not intended to have a limiting effect on the scope of the instant invention.

From FIGURE 1 it will be seen that the auxiliary firebox of this invention consists of a base element 10, having upturned sides 11, 11', 12, 12', forming a drip pan in which any drippings from the meat or poultry being cooked can be retained. A pair of auxiliary fireboxes 13 and 14 are attached respectively to sides 11 and 11' of base member 10. In the preferred embodiment, the fireboxes 13 and 14 are removably attached to sides 11 and 11' by means of clip elements 15 which are struck out from the portion of the side of the firebox abutting the sides 12, 12' of the base member 10 upon which is firebox is obliquely mounted. The fireboxes 13 and 14 are constructed such that they diverge outwardly from the base member 10, and consist of a back side 16, a front side 17 having a reticulated section and a depending skirt extension 17', and a bottom element 18; which connects the back side to the free end of the skirt extension. The sides of the fireboxes 13, 14 are enclosed by suitable end elements 19 and 20. The top of the firebox is left open to provide a means for positioning the solid fuel C therein. The front side 17 is formed from a reticulated sheet metal to permit the heat produced by the glowing charcoal to radiate inwardly toward the cooking meat or poultry F. To provide the proper draft for starting and maintaining the fire, openings 21 are formed in bottom element 18 of the fireboxes 13, 14. The size of the draft openings can be made adjustable by providing a suitable slide 51 and openings 52 which cooperates with the openings to open, partially open or close the openings 21. Auxiliary draft holes 21' are also located in the depending skirt extension 17' of the front side 17. An inwardly directed flange 50 is formed in the opening to assist in positioning the front side 17.

In order to install the illustrative auxiliary firebox of a conventional barbecue brazier, a downwardly depending shaft 22 is centrally located in the bottom of base member 10 and mounted thereon. The downwardly depending shaft 22 projects perpendicularly from the bottom of base member 10 and consists of a rod or tube having a diameter which permits it to be slidably mounted in the sleeve 23, which is normally employed to retain a similar shaft utilized with the flat grill assembly generally employed in a barbecue brazier. A cap member 24 attached to the base member 10 and the shaft 22 is employed to mount the shaft on the base member 10.

Conventional barbecue braziers are provided with mechanism 74 (shown schematically) for raising or lowering the grill to effect a control of the height of the grill from the heat source. Such mechanisms operate by contacting the shaft of the grill which slides in sleeve 23. In FIGURE 1, it will be noted that an opening lever 25, which is provided with a pivotally mounted latch lever 26, illustrates control means used to operate adjustment mechanism 74 of a conventional barbecue brazier. This height adjustment mechanism 74, which connects with the bottom of shaft 22, is conveniently used in conjunction with the auxiliary firebox of this invention to obtain a proper positioning of the firebox with respect to the size of the meat or poultry being cooked. In the event that several small size chickens are being barbecued on a spit, it would be desirable to adjust the position of the firebox upwardly in order to bring the source of heat closer to the food being cooked. On the other hand, if a larger size roast or the like is being cooked, it may be necessary to adjust the position of the firebox downwardly in order to permit the operation of the rotating spit, which is shown in FIGURE 1. This rotating spit is a conventional accessory which is used on a barbecue brazier and consists of a shield which is attached to the rim of the brazier 31 by suitable attachment means such as clips 32. The front marginal edge of the shield 30 is provided with slots 33, which function as a journal for the rotating spit 34. An electrical motor 35 is used to rotate the spit 34. Power to the electrical motor 35 is supplied by electrical conductor 36. Generally, the meat or poultry are impaled upon the spit 34 and a plurality of forks 37 are slidably mounted to grip the meat or poultry. The forks are used to engage the meat or poultry and, by means of a suitable locking device provided on the forks, retain the meat or poultry in a fixed position with relationship to the rotating spit.

The use of the instant invention is illustrated in FIGURE 1, which shows the auxiliary firebox mounted in a conventional barbecue brazier. A rotating spit assembly is used to hold the meat F being barbecued by a heat supplied by burning charcoal C located in the opposed fireboxes 13 and 14.

Although the foregoing invention has been described with reference to the illustrative embodiment, it is obvious that various modifications can be adopted by those skilled in the art without departing from the scope of this invention. In the illustrated embodiment, the fireboxes are mounted on the base member such that the reticulated front side of the firebox is at an angle of about 45° with relationship to the upturned side of the base member. It is evident, however, that the angular positioning of the firebox can deviate from this 45° angle within the range of about 30° to 60°. In some instances, it may be desirable to employ fireboxes which are positioned normal to the base member, especially where flat cuts of meat such as steak or poultry cut into separate pieces are barbecued in a cage attachment mounted on the spit. In this instance, however, the spit would not rotate and would simply serve as a means for holding the meat or poultry in the cooking position. To permit flexibility in the use of the auxiliary firebox, it may be desirable to pivotally mount the respective fireboxes on the base member to permit their adjustment into a desired angular position. A suitable locking means can be used to hold the fireboxes at the selected angle.

In assembling the components of the barbecue accessory of this invention, conventional materials of construction can be employed. It is preferred that ordinary low carbon sheet steel of about twenty-four gauge be employed; however, heat-resistant alloys such as stainless steel or the like can be employed. The reticulated front side of the firebox can be formed by utilizing a perforated sheet metal or a sheet formed by conventional metal expanding processes. The volume of the firebox is a matter of design, but is generally sufficient to provide at least one layer of charcoal briquettes of standard size. The length of the barbecue accessory of this invention will, of course, depend upon the manner in which it is being employed. In the event that it is designed for use with a barbecue brazier, the length of the barbecue accessory will be sufficient to permit the accessory to be mounted conveniently on the brazier firebox in order to permit it to use not only the grill adjusting mechanism, but also the conventional barbecue brazier accessories such as rotating spits and the like.

As pointed out above, the barbecue accessory of this invention can be employed as a complete unit without being employed with a conventional barbecue brazier. In this instance, a suitable supporting stand would have to be provided and means also utilized for mounting a spit on the stand or base member, such that the food to be barbecued could be conveniently suspended between the opposed fireboxes. Although primarily concerned with the cooking of meat or poultry, it is evident that other food such as corn, potatoes and other similar comestibles can be conveniently cooked utilizing the barbecue accessory of this invention. Accordingly, the scope of the subject invention is to be limited only in the manner set forth in the appended claims.

What is claimed is:

1. A cooking apparatus for supplying heat to a spit comprising a pan member having upturned sidewalls to form a drip pan, a pair of hollow fireboxes mounted obliquely on opposed upturned sidewalls of said pan member, said fireboxes being open-topped with facing sides of said fireboxes being reticulated to permit the projection of radiant heat therethrough, said fireboxes diverging outwardly of said pan member.

2. A cooking apparatus in accordance with claim 1 in which said fireboxes are constructed to be detachably mounted on said pan member.

3. A cooking apparatus in accordance with claim 1 in which said pan member is provided with a shaft member depending perpendicularly and downwardly therefrom.

4. A cooking apparatus in accordance with claim 1 in which draft control means are provided on said fireboxes.

5. A cooking apparatus for supplying heat to a spit comprising a pan member having upturned sidewalls to form a drip pan, a shaft member depending perpendicularly and downwardly from said pan member, a pair of fireboxes obliquely mounted on opposed upturned sidewalls of said pan member, said fireboxes detachably mounted on said sidewalls and diverging outwardly from said pan member, and said fireboxes being open-topped with the facing sides of said fireboxes being reticulated to permit the projection of radiant heat therethrough.

6. A cooking apparatus for supplying heat to a spit comprising a pan member with upturned sidewalls to form a drip pan, a pair of fireboxes obliquely mounted on opposed upturned sidewalls of said pan member, said fireboxes being open topped with facing sides of said fireboxes being reticulated to permit the projection of radiant heat therethrough, said fireboxes diverging outwardly from said pan member and comprising respectively a solid back side and a reticulated front side spaced therefrom in substantially parallel relationship, said front side having a solid skirt extension angularly depending therefrom and having a free end, a bottom element extending perpendicularly from the free end of said skirt extension and being joined along the side thereof opposed to said extension to said back side, said bottom element being provided with draft openings and solid end elements enclosing the sides of said fireboxes, said skirt extension being constructed to be contiguously mounted on a longitudinal sidewall of said pan member, with the angular relationship between said front side and its skirt extension being such that said fireboxes diverge outwardly at a selected angle.

7. A cooking apparatus in accordance with claim 6 in which said skirt extension is provided with means for detachably mounting said fireboxes on said sidewalls.

8. A cooking apparatus in accordance with claim 6 in which a shaft member is dependently mounted downwardly and perpendicularly from said pan.

9. A cooking apparatus for supplying heat to a spit comprising a pan member having upturned sidewalls to form a drip pan, a pair of fireboxes mounted obliquely on opposed upturned sidewalls of said pan member and being open-topped, said fireboxes diverging outwardly from said pan member and comprising respectively a back element, a front element having a portion substantially parallel to said back element and a skirt extension depending downwardly from the lower marginal edge of said front element, said portion being reticulated to permit the projection of radiant heat therethrough, a bottom element connecting said back and front elements and end elements connected to said bottom, front and back elements, with the angular relationship between said front sides and its skirt extension being such that said fireboxes diverge outwardly at a selected angle.

10. A cooking apparatus in accordance with claim 9 in which draft control means are provided on said fireboxes.

11. A cooking apparatus comprising a pan member having upturned sidewalls to form a drip pan, a shaft member depending perpendicularly and downwardly from said pan member, fireboxes mounted obliquely on opposed upturned sidewalls of said pan member and including means for detachably mounting said fireboxes, a spit mounted above said pan member on a horizontal axis lying in a plane which bisects the angle between said fireboxes, said fireboxes being open-topped with the facing sides of said fireboxes being reticulated to permit the projection of radiant heat therethrough, said fireboxes diverging outwardly from said pan member, draft control means provided on said fireboxes, a brazier tray mounted below said fireboxes, and means for adjusting the distance between said pan member and said spit.

12. A cooking apparatus in accordance with claim 11 in which said fireboxes diverge outwardly from said pan member and comprising respectively a solid back side and a reticulated front side spaced therefrom in substantially parallel relationship, said front side having a solid skirt extension angularly depending therefrom and having a free end, a bottom element extending perpendicularly from the free end of said skirt extension and being joined along the side thereof opposed to said extension to said back side, said bottom element being provided with draft openings and solid end elements enclosing the sides of said fireboxes, said skirt extension being constructed to be contiguously mounted on a longitudinal sidewall of said pan member, with the angular relationship between said front side and its skirt extension being such that said fireboxes diverge outwardly at a selected angle.

References Cited by the Examiner
UNITED STATES PATENTS

| | | | |
|---|---|---|---|
| 1,997,192 | 4/1935 | Kasamis | 99—392 |
| 2,109,079 | 2/1938 | Zeigler et al. | 126—14 X |
| 2,441,190 | 5/1948 | Fuller | 126—14 X |
| 2,989,915 | 6/1961 | Lonzi | 99—391 |
| 3,040,730 | 6/1962 | Hurko et al. | 126—25 |
| 3,062,128 | 11/1962 | Louthan | 99—446 |

JAMES W. WESTHAVER, *Primary Examiner.*